US010221980B2

(12) United States Patent
Tiberghien et al.

(10) Patent No.: US 10,221,980 B2
(45) Date of Patent: Mar. 5, 2019

(54) QUICK COUPLING FOR THE DISCONNECTABLE CONNECTION OF PIPELINES OF FLUID UNDER PRESSURE

(71) Applicant: STAUBLI FAVERGES, Faverges (FR)

(72) Inventors: Alain-Christophe Tiberghien, Sevrier (FR); Christophe Durieux, Gilly sur Isere (FR); Frederic Morel, Lathuile (FR)

(73) Assignee: STAUBLI FAVERGES, Faverges (FR)

( * ) Notice: Subject to any disclaimer, the term of this patent is extended or adjusted under 35 U.S.C. 154(b) by 47 days.

(21) Appl. No.: 15/398,348

(22) Filed: Jan. 4, 2017

(65) Prior Publication Data
US 2017/0211738 A1    Jul. 27, 2017

(30) Foreign Application Priority Data

Jan. 22, 2016 (FR) ...................... 16 50515

(51) Int. Cl.
*F16L 37/40* (2006.01)
*F16L 37/14* (2006.01)
(Continued)

(52) U.S. Cl.
CPC ........... *F16L 37/40* (2013.01); *F16L 37/0841* (2013.01); *F16L 37/144* (2013.01); *F16L 37/34* (2013.01)

(58) Field of Classification Search
CPC ......... F16L 37/40; F16L 37/34; F16L 37/144; F16L 37/0841; F16L 37/088;
(Continued)

(56) References Cited

U.S. PATENT DOCUMENTS 2,727,759 A    12/1955 Elliott
2,926,934 A  *  3/1960 Gill .................... F16L 37/23
                                          137/614.04
(Continued)

FOREIGN PATENT DOCUMENTS

DE    10304151    8/2004
FR    1185471    12/1957

OTHER PUBLICATIONS

Machine Translation of DE10304151, retrieved Mar. 15, 2018.*
French Search Report in related French Application No. 1650515, dated Sep. 15, 2016.

*Primary Examiner* — Michael R Reid (57) ABSTRACT

The invention relates to a quick coupling for the disconnectable connection of pipelines for a pressurized fluid, this coupling comprising a plug element and a socket element (100) intended to be coupled with one another, the socket element including a hollow cylindrical body (102) centered on a central axis (X100) and including an inner radial surface and an outer radial surface and defining a radial opening (104), and a locking element (118), comprising a translatable member (118a), along a radial translation axis relative to the central axis, inside the radial opening (104), which is able to guide the member (118a) between a first position, in which the member protrudes inward relative to the inner radial surface, and a second position, in which the member protrudes outward relative to the outer radial surface and in which the member (118a) does not protrude inward relative to the inner radial surface, the plug element comprises a locking ring that is axially movable between a locking position, in which it surrounds the peripheral groove, and an unlocked position, in which it does not surround the peripheral groove. The locking element (118) being able to drive the locking ring from its locking position (Continued)

toward its unlocked position when its member (118a) is in its second position.

15 Claims, 10 Drawing Sheets (51) Int. Cl.
*F16L 37/084* (2006.01)
*F16L 37/34* (2006.01)

(58) Field of Classification Search
CPC ... F16L 37/091; F16L 37/098; F16L 37/0982; F16L 37/0985; Y10T 137/87941; Y10T 137/87949; Y10T 137/87957; Y10T 137/87965
USPC .................................. 137/614.02–614.05
See application file for complete search history.

(56) References Cited

U.S. PATENT DOCUMENTS

| | | | | |
|---|---|---|---|---|
| 3,195,935 | A | * | 7/1965 | Beebee .................. F16L 37/22 137/614.03 |
| 5,275,443 | A | * | 1/1994 | Klinger ................. F16L 37/144 285/305 |
| 2004/0012201 | A1 | * | 1/2004 | Bartholoma ........ F16L 25/0045 285/39 |
| 2005/0248152 | A1 | * | 11/2005 | Viegener ............... F16L 13/142 285/307 |
| 2010/0201123 | A1 | | 8/2010 | Kitagawa |

\* cited by examiner

QUICK COUPLING FOR THE DISCONNECTABLE CONNECTION OF PIPELINES OF FLUID UNDER PRESSURE

The present invention relates to a quick coupling designed for the disconnectable connection of pipelines traveled by a fluid under pressure. Such pipelines are used in many on board systems, for example in a hydraulic cooling system of a motor vehicle. In a known manner, a coupling comprises a complementary plug element and socket element.

In the field of quick couplings for cooling systems, the company STÄUBLI FAVERGES has developed a line of couplings sold under the SPT reference. In particular, the SPT10 coupling comprises a plug element, called end piece, and a socket element. The socket element comprises a hollow cylindrical body defining an inner radial surface and an outer radial surface and comprising a series of radial openings in which locking beads are housed. These locking beads are radially movable between a first position in which they protrude inward relative to the inner radial surface of the body and a second position in which they protrude outward relative to the outer radial surface of the body. The beads are kept in their first position by a locking ring mounted around the first body of the socket element.

The plug element also comprises a hollow cylindrical body, which defines an inner passage for the fluid, which is provided to be engaged inside the socket body and which comprises an outer radial surface defining a peripheral groove for receiving the beads.

During the coupling of the plug and socket elements of the SPT10 coupling, the locking ring should be withdrawn to free the beads. The plug body then drives the locking beads outward. When the peripheral groove of the plug body axially arrives across from the beads, the latter then fall into the groove and the locking ring is elastically returned to the covering position. The coupling is then locked.

Although it works correctly, this coupling has several drawbacks:
  a first drawback is that in the long term, the successive contacts between the locking beads and the groove of the plug element cause localized plastic deformation, or burring, of the body of the plug element. This burring may lead to the appearance of curls or scales that may hinder the proper working of the coupling and limit its lifetime.
  a second drawback of this coupling is that the locking is not automatic because it requires manually withdrawing the locking ring to free the locking beads and insert the plug body into the socket body. The locking ring must be kept behind at least until the peripheral groove of the plug body arrives across from the beads;
  a third drawback of this coupling is that it is relatively bulky in the radial direction due to the presence of the locking ring around the socket body.

Among the existing publications on this subject, FR-A-1,185,471 and U.S. Pat. No. 2,727,759 each disclose a coupling according to the preamble of claim 1. However, these couplings use beads as locking members, which causes burring of the plug body in the long term.

DE-A-103 04 151, which also discloses a quick coupling according to the preamble of claim 1, has the advantage that the locking members are not beads, but ring segments. This makes it possible to obtain a linear contact with the plug body, which limits the plastic deformations in the long term. Nevertheless, the socket element comprises an outer cover and a body with two radial stages to maintain the locking members. This coupling is therefore not very compact in the radial direction.

The invention more particularly intends to resolve these drawbacks by proposing a quick coupling with automatic locking, with an increased lifetime and a reduced radial bulk.

To that end, the invention relates to a quick coupling for the disconnectable connection of pipelines for a pressurized fluid, this coupling comprising a plug element and a socket element intended to be coupled with one another, the socket element including:
  a hollow cylindrical body centered on a central axis and including an inner radial surface and an outer radial surface and defining a radial opening, and
  a locking element, comprising a translatable member, along a radial translation axis relative to the central axis, inside the radial opening, which is able to guide the member between a first position, in which the member protrudes inward relative to the inner radial surface, and a second position, in which the member protrudes outward relative to the outer radial surface and in which the member does not protrude inward relative to the inner radial surface,
the plug element including:
  a hollow cylindrical body, which is provided to be engaged inside the hollow cylindrical body of the socket element and which comprises an outer peripheral surface provided with a peripheral groove for receiving the movable member,
  a locking ring that is axially movable between a locking position, in which it surrounds the peripheral groove, and an unlocked position, in which it does not surround the peripheral groove, the locking element being able to drive the locking ring from its locking position toward its unlocked position when its member is in its second position, and
  means for returning the locking ring to the locking position. According to the invention, the locking element includes at least one elastic arm able to return the member toward its first position.

Owing to the invention, when the two coupling elements are brought closer together, the hollow cylindrical body of the plug element automatically pushes the moving member of the locking element into its second position, such that the continued coupling movement drives the movement of the locking ring from its locked position toward its unlocked position in contact with the moving member of the locking element. The movement of the locking ring continues until the moving member of the locking element arrives at the same level as the peripheral groove of the outer peripheral surface of the hollow cylindrical body of the plug element. At that moment, the moving member of the locking element returns to the first position and the locking ring is automatically returned to the locking position. The locking of the coupling in the coupled configuration is therefore done simply by engaging the body of the plug element inside the body of the socket element. Furthermore, the coupling is compact in the radial direction because the locking ring and its return means are arranged around a hollow cylindrical body of the plug element, which has an outer diameter that by definition is smaller than that of the hollow cylindrical body of the socket element. Moreover, a moving member different from a bead can be used, which makes it possible to avoid periodic contact between the moving member and the peripheral groove and to thereby limit the burring of the body of the plug element in the long term.

According to advantageous, but optional aspects of the invention, such a coupling may include one or more of the following features, considered in any technically allowable combination:

The member comprises a bevel able to cooperate during coupling with a junction edge between the outer peripheral surface and an axial end surface of the hollow cylindrical body of the plug element;

The member comprises a bevel able to cooperate with a complementary edge of the peripheral groove in the coupled configuration;

The locking ring comprises, at one axial end, an inner bevel able to cooperate with the member during coupling;

The locking element is made from plastic;

The locking element comprises two elastic arms that extend symmetrically from the member;

Each elastic arm is an arc of circle, the curve radius of the inner radial surface of the arm being identical to the curve radius of the outer radial surface of the hollow cylindrical body of the socket element;

Each elastic arm is received in a slot extending peripherally over the outer radial surface of the hollow cylindrical body of the socket element;

Each arm extends such that its free end defines, with a plane of symmetry of the member, an angle comprised between 90° and 120°;

The moving member does not protrude outward relative to the outer radial surface of the hollow cylindrical body of the socket element when it is in its first position;

The socket element comprises two locking elements, while the hollow cylindrical body of the socket element defines two diametrically opposite radial openings to receive the respective moving members of the locking elements;

The projection of the moving member over a plane perpendicular to the radial translation axis has a non-circular contour. Preferably, the projection of the moving member over the plane perpendicular to the radial translation axis has a rectangular contour. It is further possible to provide that the projection of the moving member over the plane perpendicular to the radial translation axis extends over a transverse length comprised between 10 and 50% of the value of the diameter defining the inner radial surface of the cylindrical body of the socket element, and in particular equal to 40%.

The plug element includes a valve contained in the hollow cylindrical body and recalled toward a closed position of a fluid passage volume, in which the front end of the hollow cylindrical body of the plug element and the valve define a planar surface, while the socket element includes a plunger placed inside the hollow cylindrical body and able to push the valve of the plug element back during coupling and a gate placed between the front part of the plunger and the hollow cylindrical body and recalled by a spring toward a position closing a fluid passage volume, in which the front ends of the plunger and the gate define a planar surface situated behind the locking elements.

The invention and other advantages thereof will appear more clearly in light of the following description of four embodiments of a quick coupling according to its principle, provided solely as an example and done in reference to the appended drawings, in which:

FIG. 9 is an enlarged view of circle IX in FIG. 8, FIGS. 10 and 11 are perspective views showing two alternative embodiments of a locking element, respectively belonging to the coupling according to a second and third embodiment of the invention, FIG. 13 is a partial sectional view similar to FIG. 12 for an element belonging to a coupling according to a fourth embodiment of the invention.

FIGS. 6 to 9 show a fluid coupling R intended for the disconnectable connection of pipelines C1 and C2 for a fluid under pressure. As an example, the pipelines C1 and C2 can be used in a hydraulic cooling system of a motor vehicle. The fluid coupling R comprises a socket element 100, shown alone in FIGS. 1 to 4, and a plug element 200, shown alone in FIG. 5. The coupling elements 100 and 200 are intended to be coupled to one another and are respectively coupled to the pipelines C1 and C2.

Figure 1:
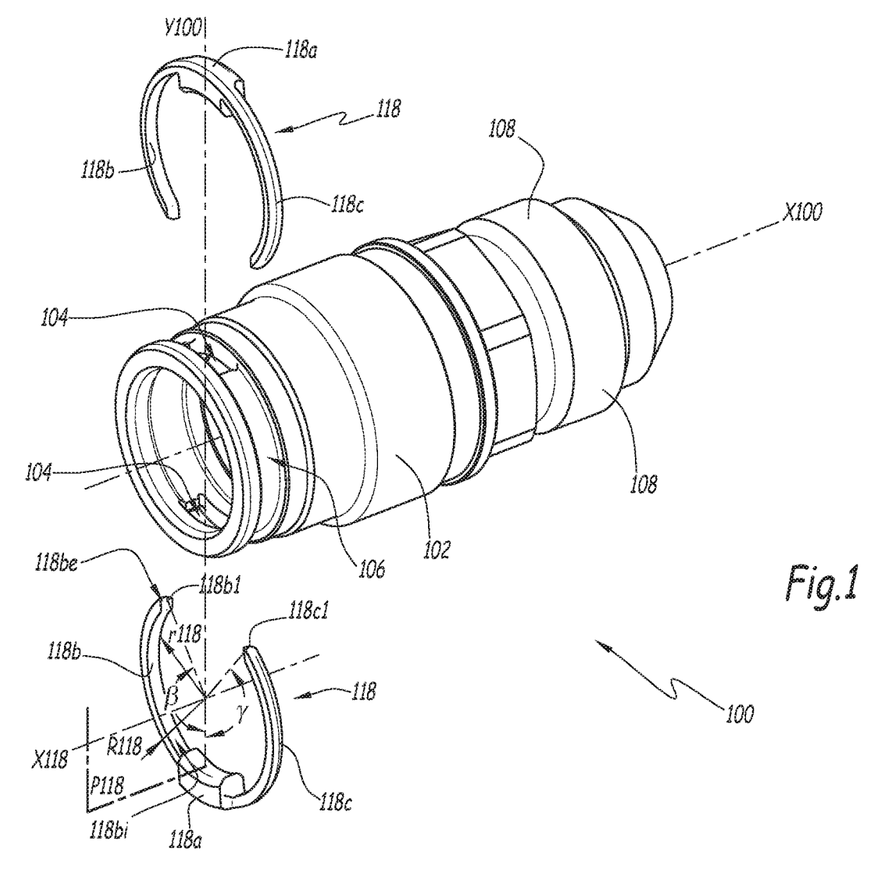
FIG. 1 is a perspective view of an a socket element that is part of a fluid coupling according to a first embodiment of the invention, two locking elements belonging to the socket element being shown separately in this figure.

As shown in FIG. 1, the socket element 100 has a substantially tubular geometry centered on a central axis X100.

Figure 2:
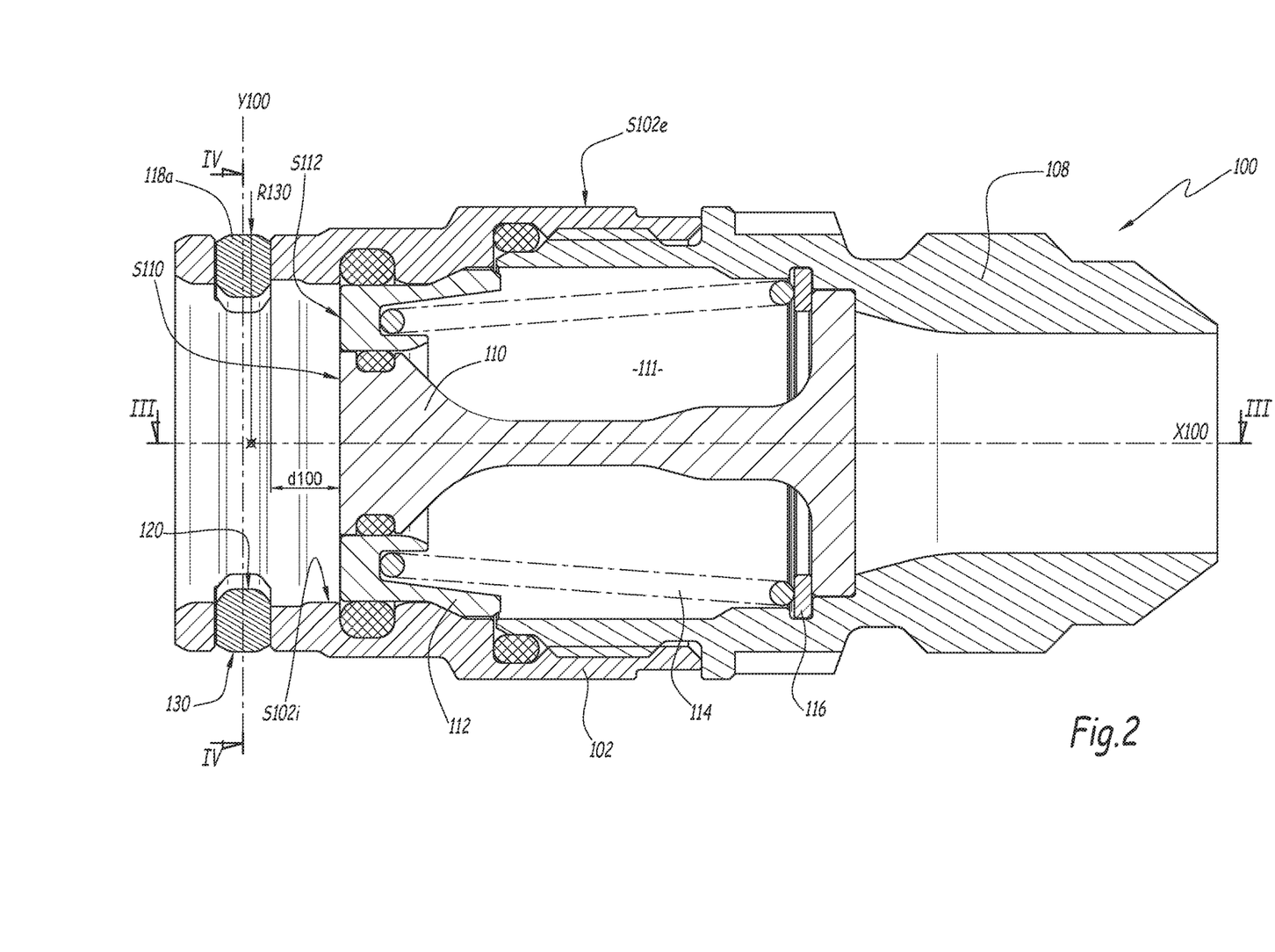
FIG. 2 is a longitudinal sectional view of the socket element of FIG. 1, in which the two locking elements are in place.
Figure 3:
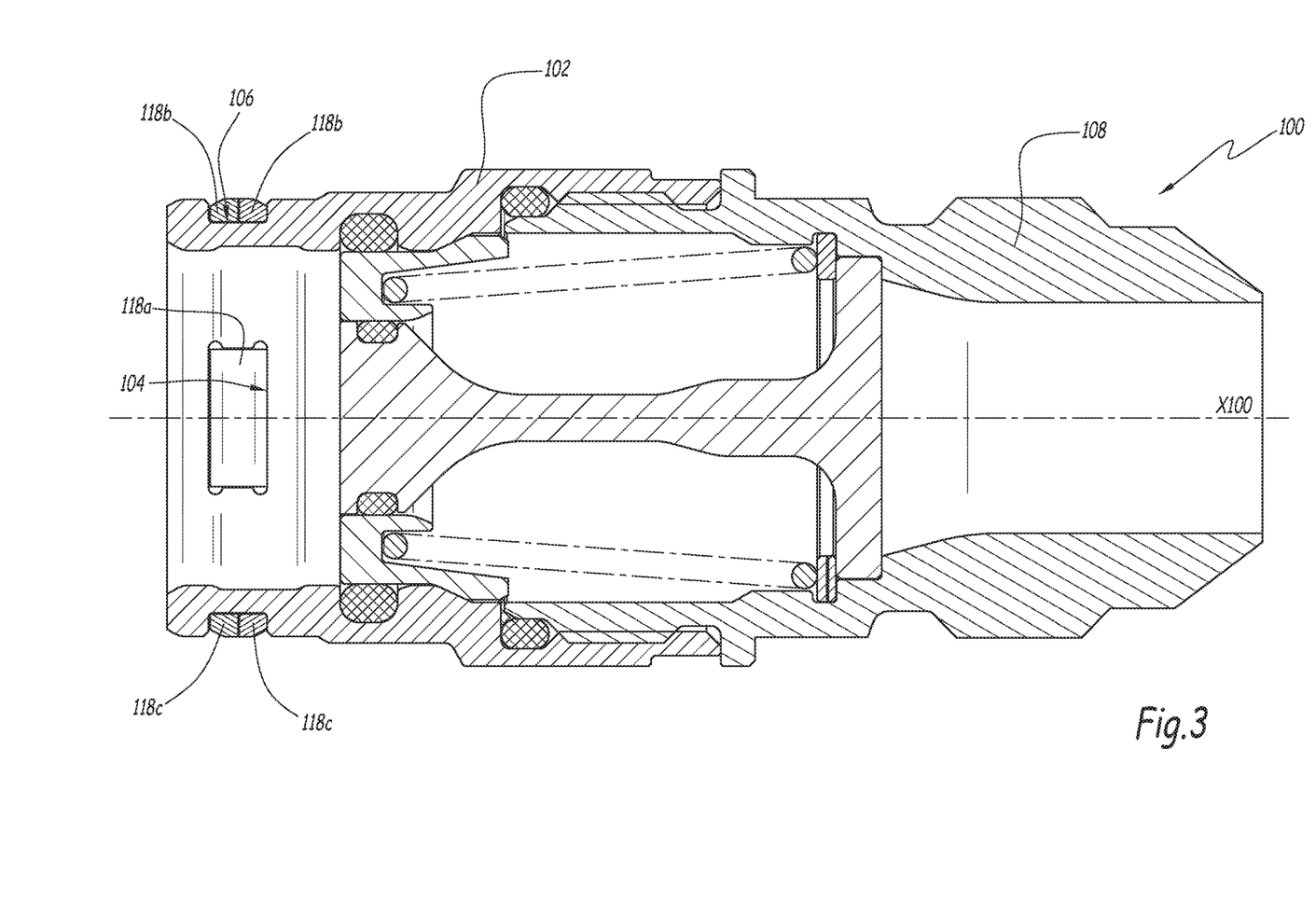
FIG. 3 is a sectional view along line III-Ill of FIG. 2.

Below, a forward direction expressed in relation to a coupling element is an axial direction oriented toward the complementary coupling element. Likewise, a rear direction expressed in relation to a coupling element is an axial direction oriented toward the pipeline to which the coupling element is connected. In the example of FIG. 2, the forward direction is a direction oriented to the left, while the rear direction is a direction oriented to the right. Furthermore, an inner direction corresponds to a centripetal radial direction relative to the axis of the coupling, while an outer direction is a centrifugal radial direction relative to the axis of the coupling.

As shown in FIG. 2, the socket element 100 comprises a hollow adapter 108 defining a passage for the fluid and supporting means for fastening to the pipeline C1. A hollow cylindrical body 102 of the socket element 100 is centered on the central axis X100 and sealably screwed on the front part of the adapter 108. The hollow cylindrical body 102 defines an inner radial surface X102$i$ and an outer radial surface S102$e$.

As shown in FIG. 1, the socket element 100 also comprises a first locking element 118 including a member 118$a$ that is received, with some play, inside a radial opening 104 defined by the hollow cylindrical body 102 of the socket element 100. The opening 104 has a rectangular contour with transverse dimensions comparable to those of the member 118a. It includes two parallel axial surfaces and two parallel surfaces equidistant from a radial plane containing the central axis X100.

The member 118a is translatable along a translation axis Y100 radial to the central axis X100 inside the radial opening 104. This radial opening 104 is provided to guide the member 118a in its radial translation movement between a first position, in which the member 118a protrudes inward relative to the inner radial surface S102i of the body 102, and a second position, in which the member 118a protrudes outward relative to the outer radial surface S102e of the body 102 and in which the member 118a does not protrude inward relative to the inner radial surface S102i of the body 102. The member 118a cannot rotate around its movement axis, i.e., around a radial axis. Furthermore, the member 118a has only one degree of freedom inside the opening 104.

Figures 4, 12:
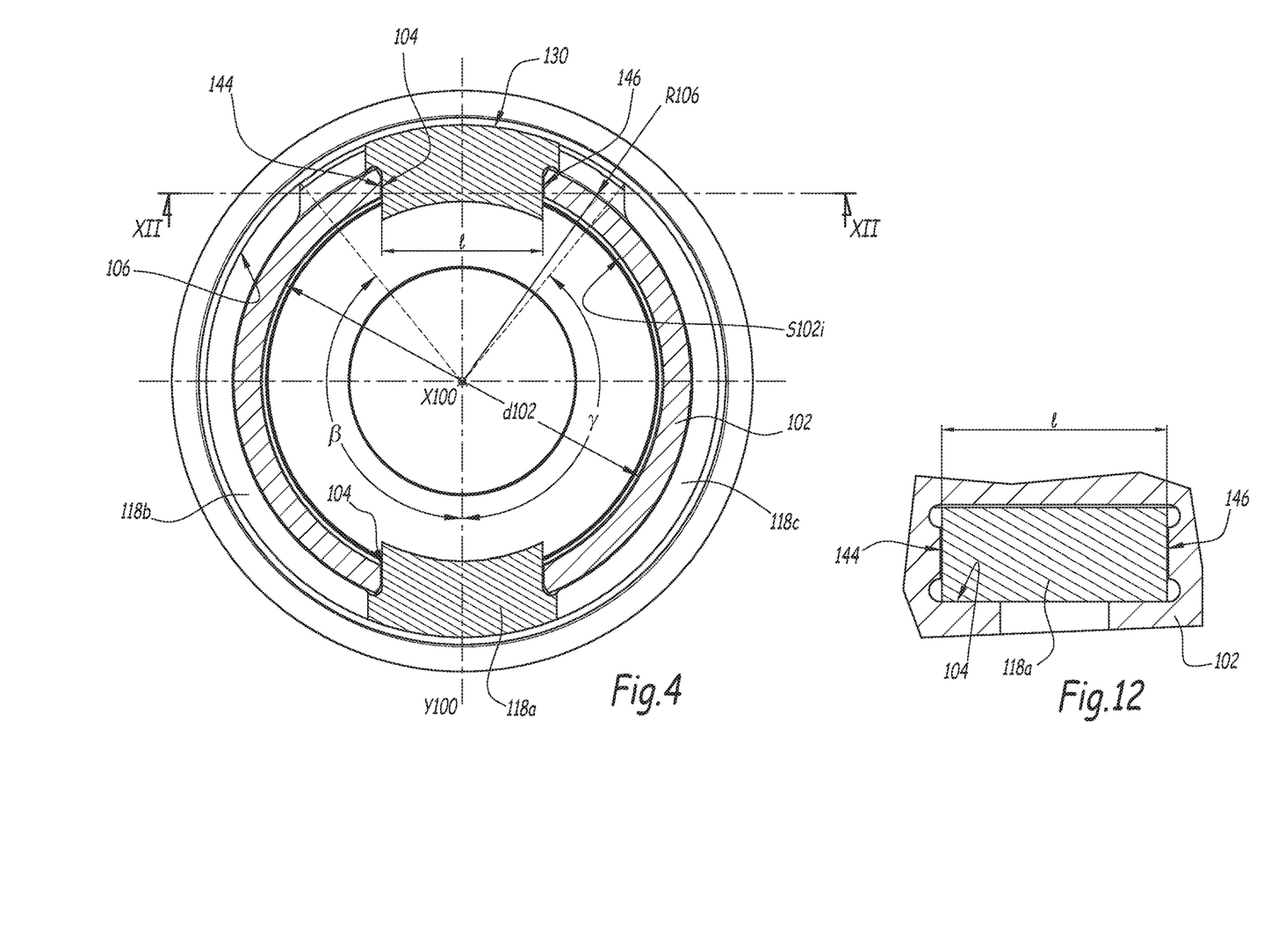
FIG. 4 is a sectional view along line IV-IV of FIG. 2.
FIG. 12 is a partial sectional view along line XII-XII in FIG. 4.

The member 118a comprises a plane of symmetry formed by a radial plane P118 that contains the radial translation axis Y100 and cuts the member 118a into two identical parts, this plane being shown only in FIG. 1. The member 118a is a ring portion centered on an axis X118 and extends between two parallel end faces 144 and 146 that are equidistant from the plane of symmetry P118 and intended to be engaged in one of the openings 104. As shown in FIGS. 4 and 12, the projection of the member 118a over a plane perpendicular to the radial translation axis Y100 has a rectangular contour and extends over a transverse length ℓ comprised between 10 and 50% of the value of the diameter d102 of the inner radial surface S102i of the cylindrical body 102, in particular equal to 40% of this diameter. The transverse length ℓ corresponds to the distance between the two end faces 144 and 146 of the member 118a.

Figure 9:
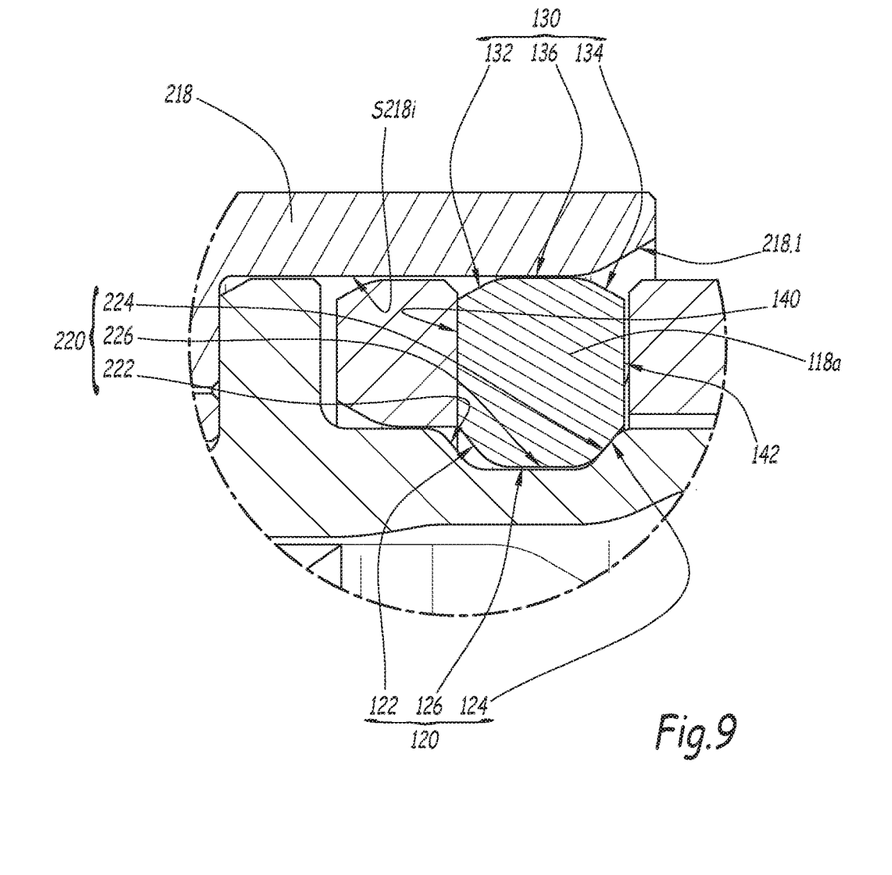

As shown in FIG. 9, the member 118a comprises two axial faces 140 and 142, respectively, which are surfaces perpendicular to the central axis X100, an inner radial face 120 and an outer radial face 130. The end faces 144 and 146 connect the axial faces 140 and 142.

The inner radial face 120 comprises a cylindrical surface 126 and two frustoconical surfaces 122 and 124. The frustoconical surfaces 122 and 124 form bevels that respectively connect the cylindrical surface 126 to the two axial faces 140 and 142. The bevels 122 and 124 are inclined by 30 to 75 degrees relative to the central axis X100, preferably 50 degrees. The outer face 130 comprises a cylindrical surface 136 and two frustoconical surfaces 132 and 134. The frustoconical surfaces 132 and 134 form bevels that respectively connect the cylindrical surface 136 to the two axial faces 140 and 142. The bevels 132 and 134 are inclined by 15 to 60 degrees relative to the central axis X118, preferably 30 degrees.

The first locking element 118 also comprises a first arm 118b in the form of an arc of circle that extends in the extension of the member 118a. In other words, the arm 118b extends, from the member 118a, along a peripheral direction around the central axis X100.

The arm 118b is received in a slot 106 extending, from the opening 104, peripherally over the outer radial surface S102e of the body 102. In the example, the slot 106 has the same width as the radial opening 104, this width being measured parallel to the central axis X100.

The curve radius r118 of the inner radial surface 118bi of the arm 118b is identical to the curve radius R106 of the bottom of the slot 106 of the hollow cylindrical body 102 of the socket element 100. The bottom of the groove 106 is the bearing zone of the arm 118b on the body 102. If the body 102 is not provided with a slot 106, the radius R106 considered here is the radius of the surface S102e at the bearing zone of the arms 118b and 118c. The curve radius R118 of the outer radial surface 118be of the arm 118b is identical to the curve radius R130 of the outer face 130. The arm 118b is attached on the end face 144 of the member 118a, which is parallel to the axis Y100 and to a plane radial to the central axis X100 in the mounted configuration of the locking element 118 in the socket element 100.

The end faces 144 and 146 of the member 118a each include four corners, respectively two inner corners and two outer corners. The arm 118b extends from an outer corner of the face 144. It is connected so as to be flush with the bevel 132 of the outer face 130 and with the front axial face 140. The arm 118c extends from an outer corner of the face 146. It is also connected so as to be flush with the bevel 132.

The arm 118b has a thickness, measured parallel to the central axis X100, that is less than half that of the member 118a of the locking element 118. The arm 118b therefore, due to its longilineal shape and its small thickness, has a certain elasticity; that is why it is called an elastic arm 118b. In particular, the elastic arm 118b deforms elastically when the member moves from its first position toward its second position and is able to recall, by elastic return of the material, the member 118a to its first position. Thus, the arm 118b makes it possible to keep the locking element 118 as close as possible to the body 102 of the socket element 100, which reduces the risks of deterioration, or even pulling out, of the element 118.

Advantageously, the first locking element 118 comprises a second elastic arm 118c, which is symmetrical with the first arm 118b relative to the plane of symmetry P118 of the member 118a. The member 118a therefore forms a body on which two arms 118b and 118c are attached on either side. Thus, the elastic return forces exerted by the two arms 118b and 118c are purely radial, which improves the guiding quality of the member 118a inside the opening 104.

Advantageously, the arms 118b and 118c each extend such that their free end exceeds an angle of 90° relative to the plane of symmetry P118 of the locking element 118. More specifically, each arm 118b and 118c extends such that its free end 118b1 or 118c1 defines, with the plane of symmetry P118 of the member 118a, an angle β or γ around the central axis X118 of the locking element 118 that is comprised between 100° and 150°, in particular equal to 140°. The arms 118b and 118c then make it possible to keep the locking element 118 on the body 102 of the socket element 100 in the uncoupled configuration.

In the example and as shown in FIG. 1, the socket element 100 comprises a second locking element 118, which is identical to the first locking element and which includes a member 118a that is received in a second radial opening 104 formed in the body 102, the two radial openings 104 being diametrically opposite. This construction with two locking elements 118 makes it possible to improve the resistance of the coupling to the repelling force due to the pressure of the fluid relative to a construction with a single locking element.

In the uncoupled configuration, the locking elements 118 are completely contained in the slot 106 and the openings 104. In other words, when the member 118 is in its first position, it does not protrude relative to the outer radial surface S102e of the body 102. Furthermore, the axis X118 is combined with the central axis X100.

The two locking elements 118 form a single piece, for example obtained by machining a steel or plastic blank or by injection molding a plastic material.

The slot 106 connects the openings 104 on each side. It therefore extends over the entire circumference of the body 102.

As shown in FIG. 1, the two locking elements 118 are mounted in an inverted manner relative to one another. Thus, in the assembled configuration, the respective members 118a of the two locking elements 118 are diametrically opposite one another and the elastic arms 118b of the two locking elements 118 are arranged next to one another inside the slot 106.

As shown in FIG. 2, a plunger 110 is arranged coaxially to the inside of the hollow cylindrical body 102. The rear part of the plunger 110 includes openings, not shown, for the passage of the fluid. The plunger 110 is fastened to the adapter 108. More specifically, the rear part of the plunger 110 forms a crown that is abutting against an inner axial shoulder of the adapter 108. A washer 116 is immobilized inside a peripheral housing of the adapter 108 and keeps the rear part of the plunger 110 against the axial shoulder of the adapter 108. The washer 116 can be slotted, of the circlips type.

A gate 112 is arranged coaxially between the plunger 110 and the hollow cylindrical body 102 of the socket element 100. In the uncoupled configuration of FIG. 2, the gate 112 is in a closed position in which it sealably closes off the space between the plunger 110 and the hollow cylindrical body 102 of the socket element 100. In this configuration, the gate 112 closes off a fluid passage volume 111 around the plunger 110 and the front end axial surfaces of the plunger 110 and the gate 112, respectively referenced S110 and S112, are situated in a same plane, which is perpendicular to the central axis X100 of the socket element 100 and is arranged behind relative to the locking elements 118. In other words, the surfaces S110 and S112 are flush and situated withdrawn from the groove 106 and openings 104 by a non-zero axial distance d100. The gate 112 is recalled to the closing off configuration by elastic means. In the example, the elastic means comprise a spring 114.

Figure 5:
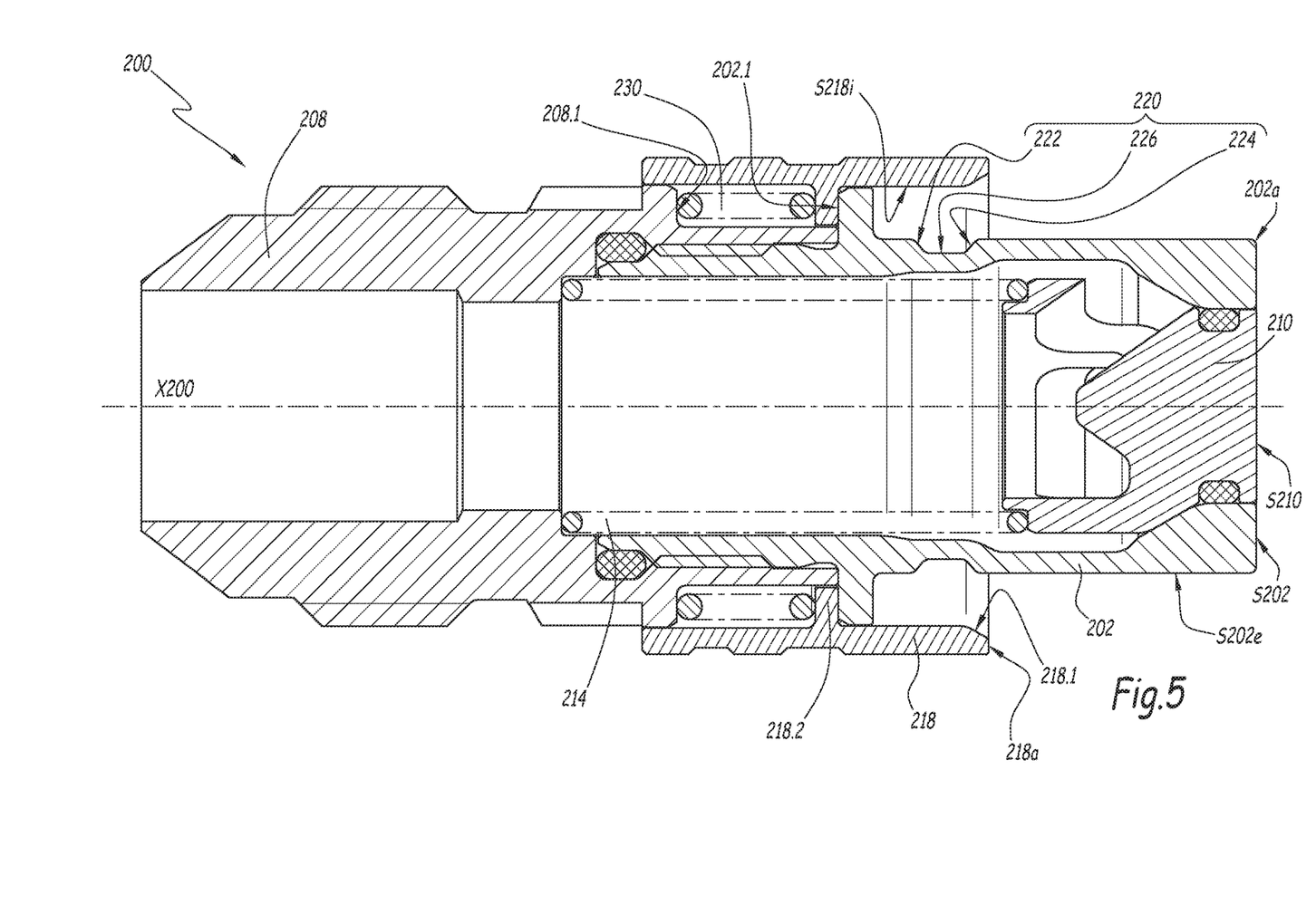
FIG. 5 is a longitudinal sectional view of a plug coupling element complementary to the socket element of FIGS. 1 to 4.

The plug element 200 of FIG. 5 also has a substantially tubular geometry centered on an axis X200. The plug element 200 comprises a hollow adapter 208 defining a passage for the fluid and supporting means for fastening to the pipeline C2.

The plug element 200 also includes a hollow cylindrical body 202 that is sealably screwed on the front part of the adapter 208. The hollow cylindrical body 202 defines an inner bore for the passage of fluid and comprises an outer peripheral surface S202e provided with a peripheral groove 220 for receiving the member 118a of each locking element 118. The peripheral groove 220 comprises a bottom 226 and two edges 222 and 224, respectively. The edge 222 constitutes a rear edge, while the edge 224 constitutes a front edge. Advantageously, the edges 222 and 224 are frustoconical surfaces inclined in a complementary manner with the bevels 122 and 124 of the member 118a. In the coupled configuration, the contact between the locking element 118 and the peripheral groove 220 bears the repelling forces and extends over an arc of circle and not a point as for the beads of the couplings of the prior art. The coupling R according to the invention is thus more robust than those of the prior art, since the beads are the source of the burring of the peripheral groove after successive coupling and uncoupling operations. The lifetime of the coupling R is therefore increased relative to that of the locking bead couplings.

A locking ring 218 is mounted, movably along an axial direction, around the hollow cylindrical body 202 of the plug element 200. The locking ring 218 comprises, at a front axial end, an inner bevel 218.1 able to cooperate with the outer face 130 of the member 118a during coupling of the plug element 200 with the socket element 100. This bevel 218.1 is a frustoconical surface that converges toward the central axis X200 in the rear direction. It connects an inner radial surface S218i of the ring 218 with a front end axial face 218a of the ring 218. Advantageously, the bevel 218.1 is inclined in a complementary manner with the bevel 132. The bevel 218.1 is inclined by 15 to 60 degrees relative to the central axis X200 and preferably by 30 degrees.

The locking ring 218 comprises an inner collar 218.2. In the configuration of FIG. 5, the locking ring 218 is in a forward position, called locking position, in which the inner radial collar 218.2 is abutting against an outer shoulder 202.1 of the body 202 and in which the ring 218 surrounds the groove 220. The locking ring 218 is kept by default in this position by the return means. In the example, these return means comprise a compression spring 230 that acts between the inner radial collar 218.2 of the locking ring 218 and a shoulder 208.1 of the adapter 208 oriented toward the front of the plug element 200.

The plug element 200 also comprises a valve 210 for closing the fluid passage volume 211. The valve 210 is positioned inside the hollow cylindrical body 202. In the uncoupled configuration of FIG. 5, the valve 210 is in a closing position. It is kept in this position by return means. In the example, the means comprise a spring 214.

In the uncoupled configuration of FIG. 5, the front end axial surfaces S210 and S202, respectively, of the valve 210 and the body 202, are situated in a same plane perpendicular to the central axis X200 of the plug element 200. In other words, the surfaces S210 and S202 are flush.

Reference 202a denotes a functional edge, which is rounded, between the surfaces S202 and S202e.

The component parts of the elements 100 and 200 are machined parts, with the exception of the helical springs 114, 214 and 230. In the example, the machined parts are made from steel. However, it is possible to machine or mold the parts in another material, such as aluminum or plastic. For example, an appropriate plastic material for the molding or machining is polyether ether ketone (PEEK), advantageously filled with carbon fibers.

The coupling of the plug element 200 with the socket element 100 is described below in relation to FIGS. 6 to 9.

Figure 6:
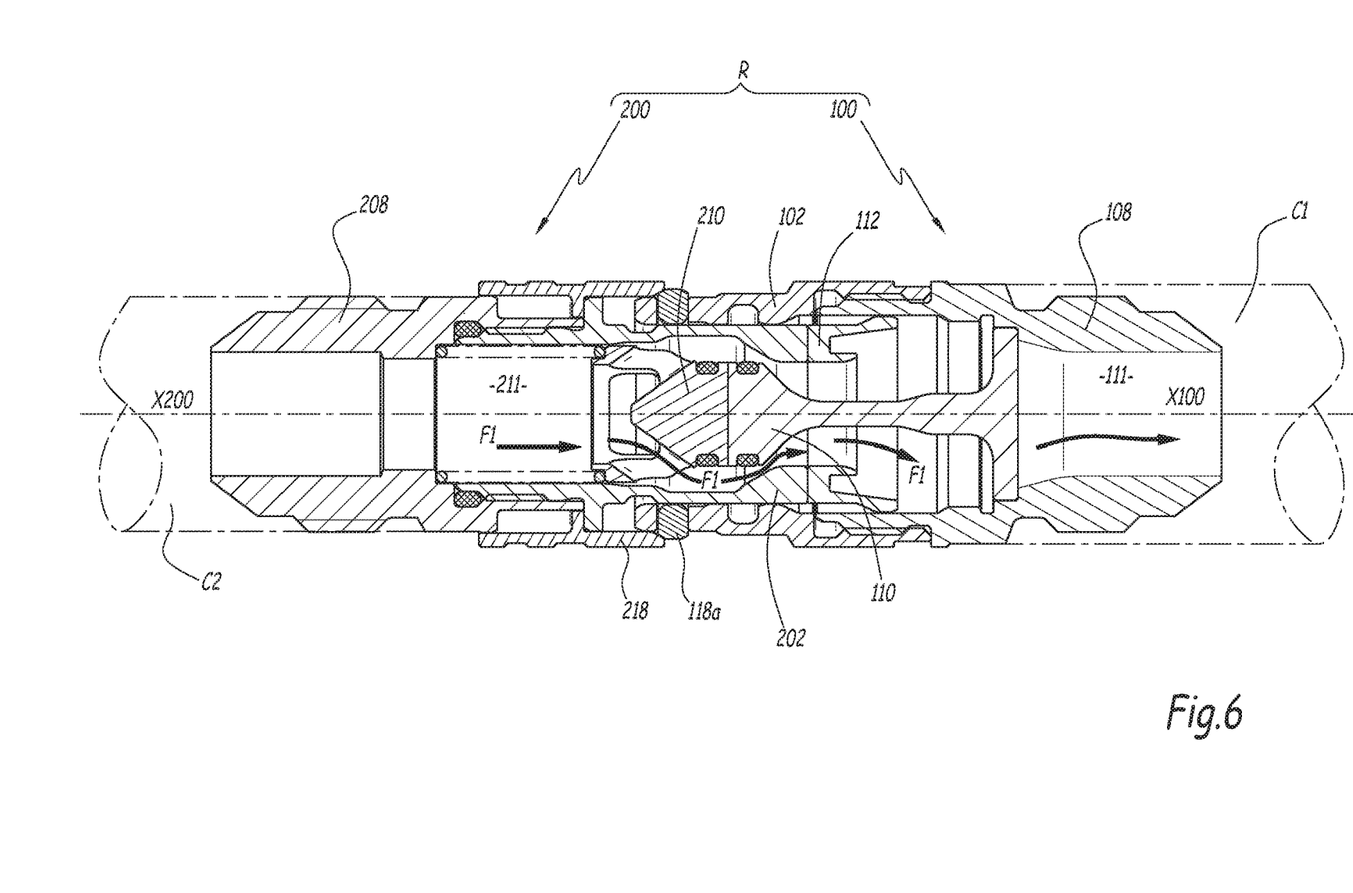
FIG. 6 is a smaller-scale longitudinal sectional view of the coupling formed by the socket and plug elements of FIGS. 1 to 5, in a first stage of the coupling.

To couple the coupling R, the plug element 200 should be brought closer to the socket element 100 to cause the body 202 of the plug element 200 to penetrate, with some radial play, inside the body 102 of the socket element 100. At this stage, the central axis of the socket element 100 is combined with the central axis X200 of the plug element 200.

The edge 202a of each hollow cylindrical body 202 of the plug element 200 then comes into contact with the front bevel 122 of the member 118a of each locking element 218 and pushes the members 118a radially outward. The front bevel 122 is therefore able to cooperate with the hollow cylindrical body 202 of the plug element 200 during the coupling. The members 118a then move from their first position toward their second position, which results in elastically deforming the arms 118b and 118c. In their second position, the members 118a no longer protrude inward relative to the inner surface S102i of the hollow cylindrical body 102, i.e., they do not oppose the advance of the hollow cylindrical body 202 of the plug element 200.

The continued coupling drives the members 118a, then in their second position, to come into contact with the locking ring 218 and push it backward against the force exerted by the spring 230. The ring 218 therefore moves in contact with the members 118a, from its locking position toward an unlocked position, in which it does not surround and no longer covers the peripheral groove 220. The spring 230 is compressed.

At a later stage of the coupling shown in FIG. 6, the plunger 110 of the socket element 100 pushes the valve 210 toward the rear, against the force exerted by the spring 214, and the hollow cylindrical body 202 of the plug element 200 pushes the gate 112 toward the rear against the force exerted by the spring 114. The fluid can then circulate between the plunger 110 and the hollow cylindrical body 102 of the socket element 100, as shown by arrows F1 in FIG. 6, or in the opposite direction.

Figure 7:
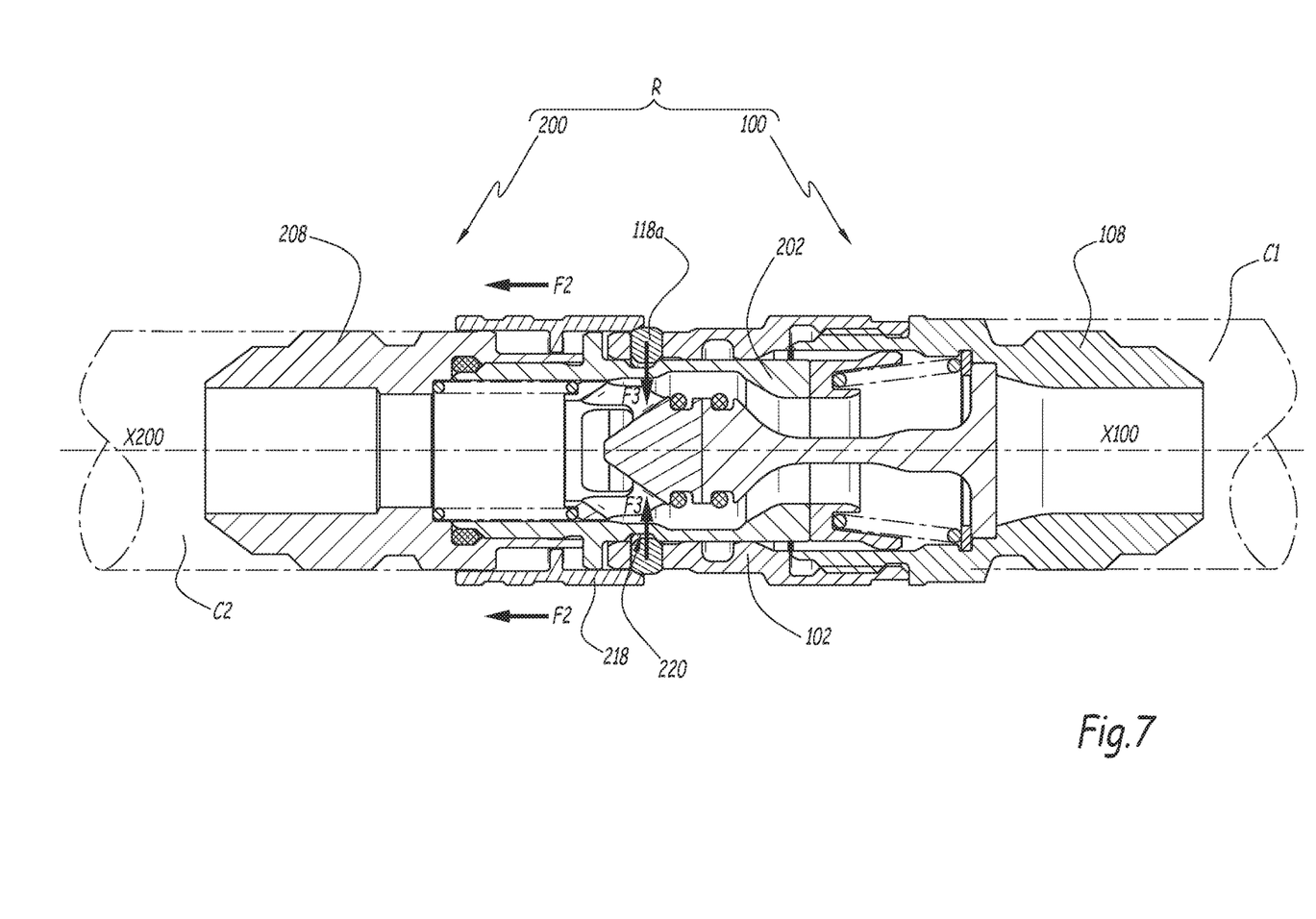
FIG. 7 is a sectional view similar to FIG. 6, in a later stage of the coupling.
Figure 8:
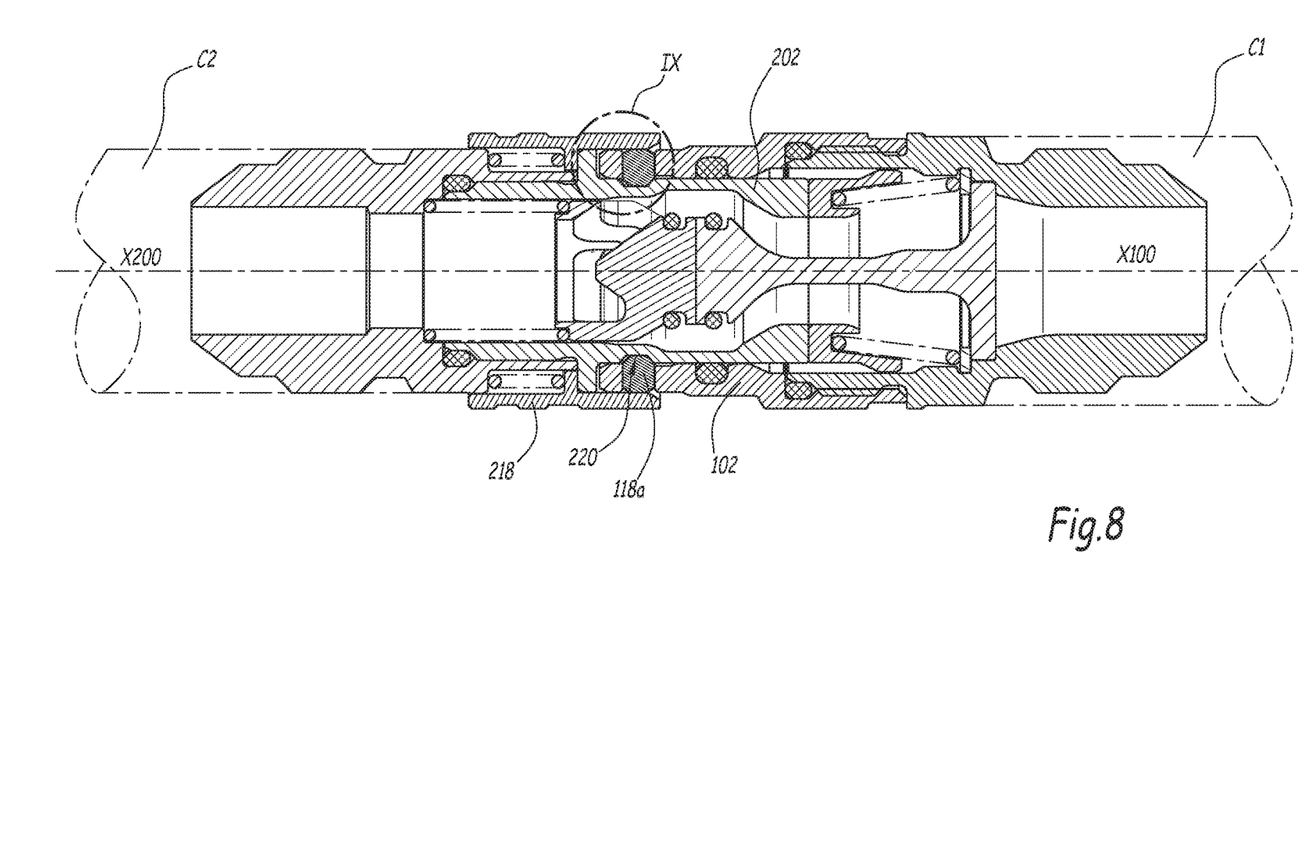
FIG. 8 is a sectional view similar to FIGS. 6 and 7, in which the coupling is shown in the coupled configuration.

The member 118a of each locking element 118 continues to push the ring 218 in the direction of arrows F2 in FIG. 7, until reaching the same axial level, along combined axes X100 and X200, as the peripheral groove 220. Once arrived in this position, the ring 218 does not surround the peripheral groove. The member 118a of each locking element 118 is then recalled to its first position under the effect of the centripetal force exerted by the locking ring 218 and engages in the groove 220. Indeed, the ring 218 is recalled in the forward direction under the action of the elastic spring 230. However, this axial force is converted into a centripetal radial force F3 by corner effect, owing to the cooperation of the bevels 218.1 and 132, respectively of the ring 218 and the member 118a, with one another. The centripetal radial force F3 is exerted on the member 118a.

Furthermore, the return of the member 118a toward its first position is advantageously favored by the elastic return of the arms 118b and 118c.

Once the members 118a are in their first position, inside the groove 220, they no longer oppose the return of the ring 218 to the locking position. The latter is then recalled in the forward direction by the spring 230, which ensures the automatic locking of the coupling R. The coupling R is shown in the coupled configuration in FIG. 8.

As shown in FIG. 9, in the coupled configuration of the coupling R, the member 118a of each locking element 118 is kept inside the groove 220 owing to three contact zones defined, first, between the rear bevel of the inner face 122 or 124, respectively, depending on the considered locking element, and the rear edge 224 of the groove 220; second, between the outer cylindrical surface 136 and the inner radial surface S218i of the ring 218; and third, between the front axial face of the member 118a, 140 or 142, respectively, depending on the considered locking element, and a front wall of the openings 104. The fact that the members 118a of the locking elements are guided purely radially inside the openings 104 guarantees good alignment of the contact surfaces relative to one another in the three aforementioned zones as well as good alignment of the beveled surfaces 218.1 and 132. In other words, this guarantees plane-on-plane contact in all of the contact zones between the member 118a and the parts 202 and 218 of the plug element 200. The burring risk of the body 202 of the plug element 200 is then limited in the long term, which makes the coupling R relatively robust.

Thus, the coupling of the coupling R is obtained simply by bringing the two coupling elements 100 and 200 closer together, without any other manipulation. The coupling is generally done while the pressure of the fluid in the pipelines C1 and C2 is low to limit the coupling forces.

To uncouple the coupling R, the locking ring 218 should be manually withdrawn toward its unlocked position and the two coupling elements 100 and 200 should be separated from one another.

In the unlocked position, the ring 218 does not oppose the movement of the member 118a from its first position toward its second position. In fact, when the elements 100 and 200 are separated from one another, the member 118a of each locking element 118 moves automatically from its first position toward its second position. More specifically, the axial withdrawal force of the plug element 202 is converted into a centrifugal radial force by corner effect, this effect being obtained by cooperation of the frustoconical surfaces 124 and 224, respectively of the member 118a and the groove 220. This centrifugal radial force is exerted on the member 118a, which is thus ejected from the groove 220.

Furthermore, the removal of the body 202 of the plug element 200 outside the body 102 of the socket element 100 is favored by the return action of the valve springs 114 and 214, such that the uncoupling is done with no excessive effort by the operator.

The continued uncoupling causes the gate 112 and the valve 210 each to respectively return to the closing off position: the fluid no longer circulates between the two coupling elements.

At a later stage of the uncoupling, the body 202 no longer cooperates with the member 118a of the locking elements 118. Owing to the elastic return of the arms 118b and 118c, the member 118a of each locking element returns to its first position, in which it protrudes relative to the surface S102i but not relative to the surface S102e. The coupling R is uncoupled.

Figures 10, 11, 13:
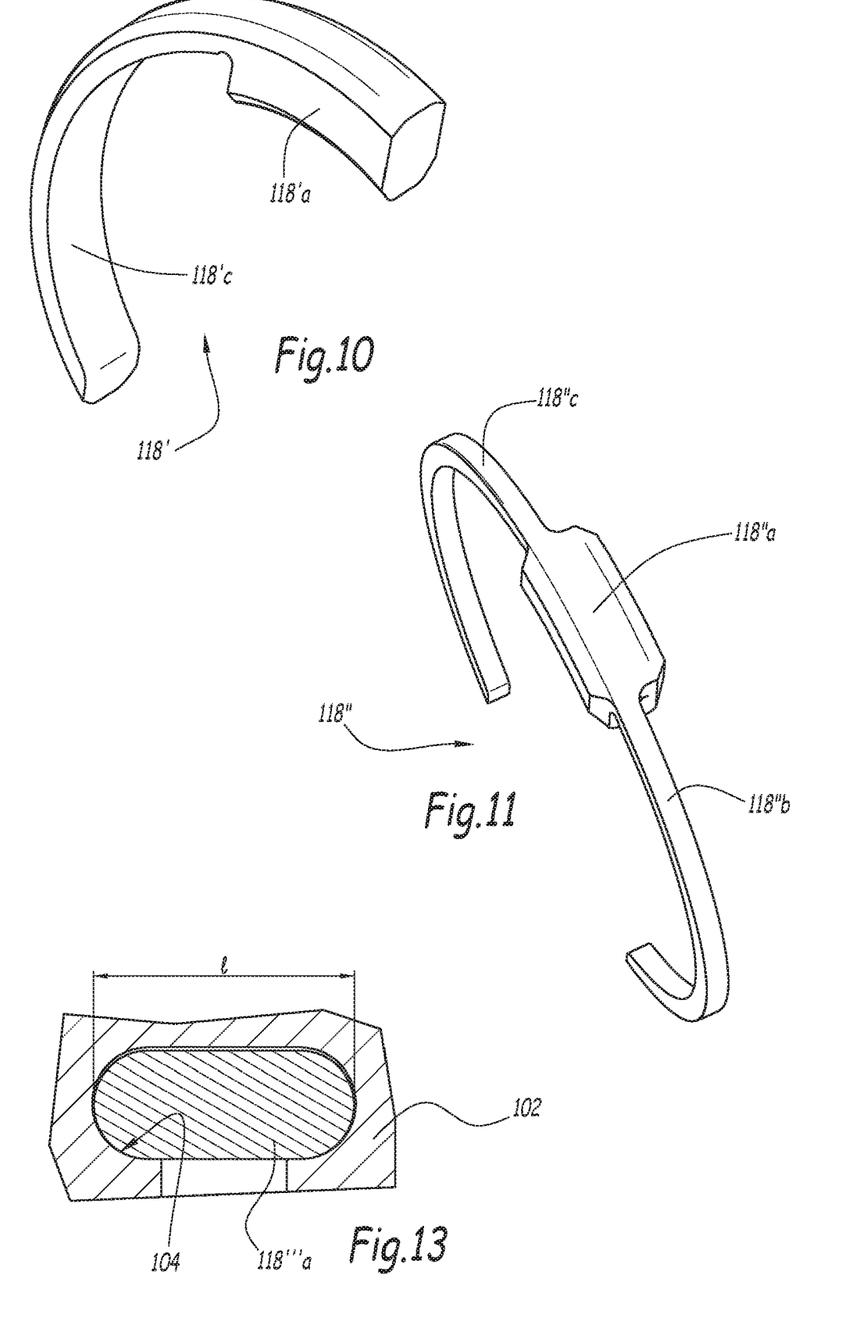

FIGS. 10, 11 and 13 respectively partially show a second embodiment, a third embodiment and a fourth embodiment of a coupling according to the invention. In these second, third and fourth embodiments, different locking elements are used. Below, only the differences with respect to the first embodiment are mentioned in the interest of concision.

In particular, in the embodiment of FIG. 10, the socket element 100 comprises two locking elements 118' each including a body 118'a forming the member of the locking element in a single elastic arm 118'c. The two locking elements 118' are mounted head to tail, i.e., the respective members 118'a of the two locking elements 118' are arranged diametrically opposite one another.

The elastic arm 118'c has a width, measured parallel to the central axis X100, that is identical to that of the member 118'a.

Unlike the first embodiment, it is not necessary to return one of the locking elements 118' relative to the other to be able to mount it on the hollow cylindrical body 102.

Advantageously, the bevels 122 and 124 [of the] two locking elements 118' are not identical, which makes it possible to optimize the separation of the locking elements 118 by the body 202 of the plug element 200 and the locking inside the peripheral groove 220 separately. It is in particular possible to consider a peripheral groove with an arc-of-circle profile and a bevel 124 that is not rectilinear, but curved.

In the embodiment of FIG. 11, the socket element 100 comprises two locking elements 118" including a body 118" a having a width greater than that of the body 118a of the elements 118 belonging to the coupling according to the first embodiment of the invention. This makes it possible to have a larger section of the locking member 118". This section must withstand the shear forces caused by the repelling forces between the plug 200 and socket 100 elements when they are coupled. The peripheral groove 220 of the body 202 also has a width greater than that of the groove 220 of the coupling according to the first embodiment of the invention. As a result, the openings 104 have a width that is larger than that of the peripheral slot 106. In this embodiment, the arms 118"*b* and 118"*c* are no longer flush with a lateral face of the body 118".

In an alternative that is not shown, the coupling comprises only one locking element 118. On pipeline couplings with a large diameter, it is also possible to consider having more than two locking elements 118, for example three or four locking elements 118.

According to the embodiment shown in FIG. 13, the body of the locking element, i.e., the member 118'''*a*, has a section, in a plane perpendicular to the plane of symmetry P118, that is defined by two equal and parallel segments connected at their ends by two half-circles. The member 118'''*a* therefore has an oblong and rounded section. The member 118''' is guided in its movement along a radial axis in a radial opening 104 of the cylindrical body 102 whereof the projection in a plane perpendicular to the radial axis is also defined by two equal and parallel segments connected at their ends by two half-circles.

According to other alternatives that are not shown, the member [of] the body of the locking element can have an elliptical or hexagonal section, which also prohibits any rotation of the locking element around a radial axis.

The invention has been described according to embodiments in which the locking elements move along a radial axis Y100 strictly perpendicular to the central axis X100. It may be implemented with a movement of the locking elements along a radial axis inclined by plus or minus 30 degrees, in the plane of FIG. 2, relative to a perpendicular to the axis X100. Such an inclined axis is said to be radial because it extends along a direction radial to the central axis X100, even if it also extends along an axial direction.

The features of the alternatives and embodiments considered above may be combined with one another to create new embodiments of the invention.

The invention claimed is:

1. A quick coupling for the disconnectable connection of pipelines for a pressurized fluid, this quick coupling comprising a plug element and a socket element intended to be coupled with one another, the socket element including:
   - a hollow cylindrical body centered on a central axis, including an inner radial surface and an outer radial surface and defining a radial opening, and
   - a locking element, comprising a member, movable along a radial translation axis relative to the central axis, inside the radial opening, which is able to guide the member between a first position, in which the member protrudes radially inward beyond the inner radial surface, and a second position, in which the member protrudes radially outward beyond the outer radial surface and in which the member does not protrude radially inward beyond the inner radial surface, the plug element including:
   - a hollow cylindrical body, which is provided to be engaged inside the hollow cylindrical body of the socket element and which comprises an outer peripheral surface provided with a peripheral groove for receiving the member,
   - a locking ring that is axially movable between a locking position, in which it surrounds the peripheral groove, and an unlocked position, in which the locking ring does not surround the peripheral groove, the locking element being able to drive the locking ring from the locking position toward the unlocked position when the member is in its second position,
   - means for returning the locking ring to the locking position, wherein the locking element includes at least one elastic arm able to return the member toward its first position.

2. The quick coupling according to claim 1, wherein the member comprises a bevel able to cooperate during coupling with a junction edge between the outer peripheral surface and an axial end surface of the hollow cylindrical body of the plug element.

3. The quick coupling according to claim 1, wherein the member comprises a bevel able to cooperate with a complementary edge of the peripheral groove in a coupled configuration.

4. The quick coupling according claim 1, wherein the locking ring comprises, at one axial end, an inner bevel able to cooperate with the member during coupling.

5. The quick coupling according to claim 1, wherein the locking element is made from plastic.

6. The quick coupling according to claim 1, wherein the locking element comprises two elastic arms that extend symmetrically from the member.

7. The quick coupling according to claim 6, wherein each elastic arm is an arc of circle, the curve radius of the inner radial surface of each arm being identical to the curve radius of the outer radial surface of the hollow cylindrical body of the socket element at a bearing zone of the elastic arm on this hollow cylindrical body.

8. The quick coupling according to claim 7, wherein each elastic arm is received in a slot extending peripherally over the outer radial surface of the hollow cylindrical body of the socket element.

9. The quick coupling according to claim 7, wherein each elastic arm extends such that its free end defines, with a plane of symmetry of the member, an angle comprised between 90° and 120°, said plane of symmetry being defined by the radial translation axis and a central axis of the locking element.

10. The quick coupling according to claim 1, wherein the member does not protrude radially outward beyond the outer radial surface of the hollow cylindrical body of the socket element when the member is in its first position.

11. The quick coupling according to claim 1, wherein the socket element comprises two locking elements and wherein the hollow cylindrical body of the socket element defines two diametrically opposite radial openings to receive the respective members of the locking elements.

12. The quick coupling according to claim 1, wherein a projection of the member over a plane perpendicular to the radial translation axis has a noncircular contour.

13. The quick coupling according to claim 12, wherein the projection of the member over the plane perpendicular to the radial translation axis has a rectangular contour.

14. The quick coupling according to claim 12, wherein the projection of the member over the plane perpendicular to the radial translation axis extends over a transverse length, which is measured along an axis perpendicular to the radial translation axis and to the central axis and which is comprised between 10 and 50% of the value of the diameter defining the inner radial surface of the cylindrical body of the socket element.

15. The quick coupling according to claim 1, wherein the plug element includes a valve contained in the hollow cylindrical body and recalled toward a closed position of a fluid passage volume, in which front ends of the hollow cylindrical body of the plug element and the valve define a planar surface and wherein the socket element includes a plunger placed inside the hollow cylindrical body and able to push the valve of the plug element back during coupling and a gate placed between a front part of the plunger and the hollow cylindrical body and returned by a spring toward a position closing a fluid passage volume, in which front ends of the plunger and the gate define a planar surface situated behind the locking element.

* * * * *